Figure 1:
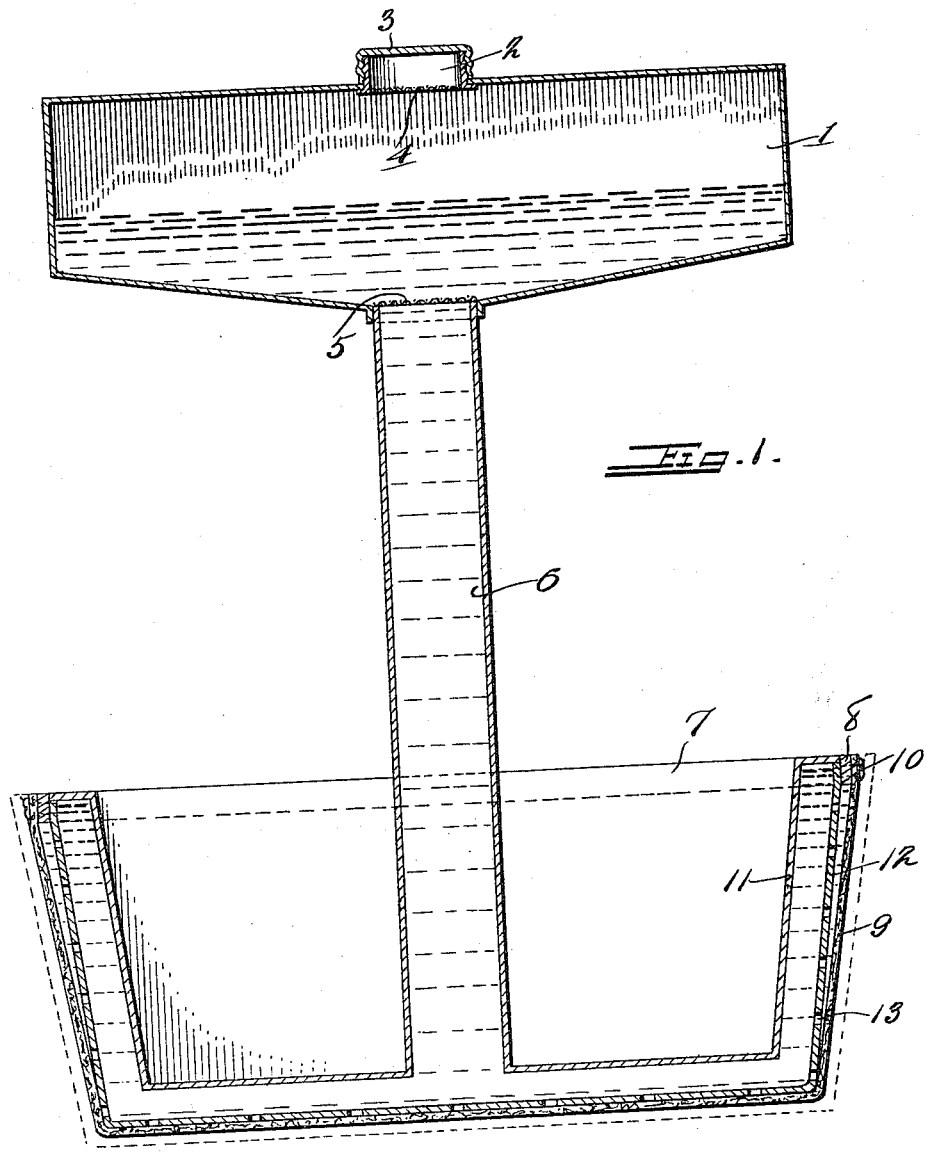

J. A. DENGLER, Jr.
BREAD PAN LUBRICATOR.
APPLICATION FILED DEC. 21, 1914.

1,168,291.

Patented Jan. 18, 1916.
2 SHEETS—SHEET 1.

Witnesses
Edw. S. Hall.
Carroll Bailey

Inventor
John A. Dengler, Jr.,
By Richard B. Owen.
Attorney

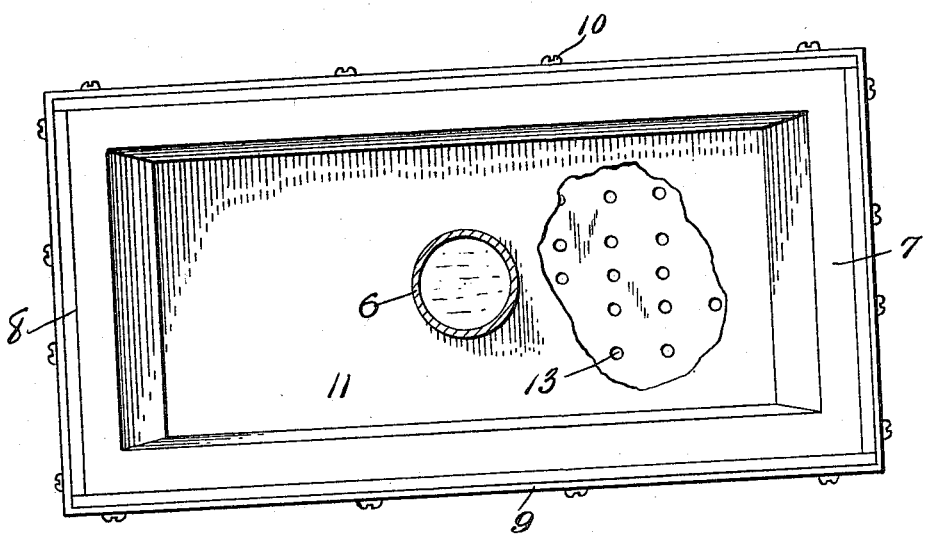
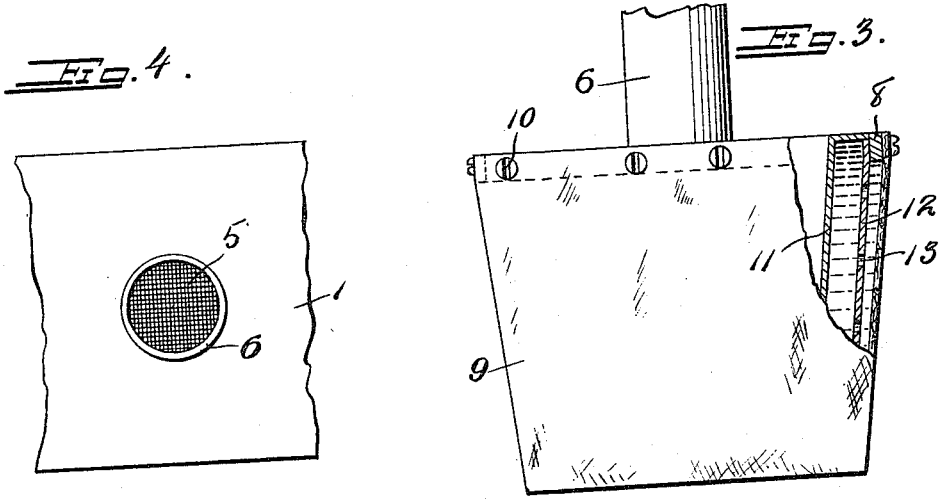

UNITED STATES PATENT OFFICE.

JOHN A. DENGLER, JR., OF NEW ULM, MINNESOTA.

BREAD-PAN LUBRICATOR.

1,168,291.  Specification of Letters Patent. Patented Jan. 18, 1916.

Application filed December 21, 1914. Serial No. 878,322.

*To all whom it may concern:*

Be it known that I, JOHN A. DENGLER, Jr., a citizen of the United States, residing at New Ulm, in the county of Brown and State of Minnesota, have invented certain new and useful Improvements in Bread-Pan Lubricators, of which the following is a specification.

This invention relates to implements for lubricating or greasing bread pans or the like, and has for its primary object to provide an implement of this character which is provided with a reservoir and a pad, the pad being supplied automatically and uniformly with grease from the reservoir.

Another object is to provide an implement of this character which is simple in construction, and thoroughly sanitary in its operation.

A further object resides in the provision of a pan greaser or lubricator in which the pad may be removed and a new one substituted.

A still further object resides in the provision of a pan lubricator which will grease the side and end walls as well as the bottom of the pan.

With these and other objects in view, the invention consists in the novel features of construction, combination and arrangement of parts as will be hereinafter more fully described, illustrated in the accompanying drawings, and claimed.

In the drawings:—Figure 1 is a vertical sectional view of the improved pan lubricator; Fig. 2 is a horizontal sectional view parts being broken away; Fig. 3 is an end elevation parts being broken away; and Fig. 4 is a detail plan view of the strainer.

Referring to the drawings by numerals, 1 designates a reservoir which may be of any desired size and shape and which is provided with a filling opening 2, closed by a cap 3, and has arranged in the lower portion thereof a strainer 4. A second strainer 5 is arranged in the lower portion of the reservoir and directly over a tube 6 which forms a means of communication between the reservoir and a distributing chamber 7.

The distributing chamber 7 comprises a substantially rectangularly-shaped body portion which is flared at both of its end and side walls in an upward direction in order to conform to the shape of the pans to be greased or lubricated.

A reinforcing strip 8 is secured in any suitable manner to the outer upper edge of the chamber and has secured thereto the upper edges of a pad 9 of felt or the like, this pad being stretched tightly over both the bottom, side and end walls of the chamber and secured to the strip 8 by means of screws 10.

In order to lessen the weight of the lubricant against the inner face of the pad, the chamber 7 is provided with inner and outer walls 11 and 12, respectively which are arranged in relatively close position. The outer wall has openings 13 formed therein to provide a passage for the lubricant to pass from the distributing chamber and on to the pad 9.

By reference to the drawings it will be seen that upon removing the cap 3, the reservoir may be filled with a suitable lubricant, such as cottonseed oil, butter, or the like and the same will pass through the tube 6 and into the distributing chamber 7, through the openings 13 and on to the pad 9. It will be seen that upon placing the implement in a pan, it is only necessary to slide the same from one end of the pan to the other in order to lubricate or grease the side and end walls as well as the bottom wall.

From the foregoing description taken in connection with the accompanying drawings it is thought that the construction and operation of the device will be clearly understood and while I have herein shown and described one specific form of my invention I do not wish to be limited thereto, except for such limitations as the claims may import.

What is claimed is:—

1. A device of the character described including a body portion, a reservoir connected to said body, the outer wall of said body provided with perforations, a pad member secured about the outer surface of said body, and means to space said pad member from the respective sides of said body to form a distributing chamber.

2. A device of the character described including a body portion, having side and end walls, a reservoir, means connecting said reservoir and said body, the outer wall of said body provided with perforations, a strip secured about said body and adjacent the upper edges of said end and side walls, a pad member arranged about the outer surfaces of said body, and means to secure the outer edges of said pad member to said strip, to space the same from the respective side and end walls of said body.

3. A device of the character described including a body portion, said body portion having outer and inner side and end walls, a reservoir, a tube connecting said reservoir and said body and forming a handle for operating the device, the outer end and side walls provided with perforations, a strip secured to the side and end walls of said body, a pad member arranged about said body, said pad member engaging the bottom thereof, means connecting said pad member and said strip, said strip spacing said pad member from the outer side and end walls of said body so as to form a distributing chamber, as and for the purpose set forth and described.

In testimony whereof I affix my signature in presence of two witnesses.

JOHN A. DENGLER, Jr.

Witnesses:
GEORGE HOGEN,
R. M. PFAENDER.

Copies of this patent may be obtained for five cents each, by addressing the "Commissioner of Patents, Washington, D. C."